United States Patent Office 2,866,792
Patented Dec. 30, 1958

2,866,792

3,4-DIHYDRO-[Δ²,²'(5H,5'H)-BIFURAN]-5,5'-DIONES AND THEIR PREPARATION

Howard E. Holmquist, Wilmington, Del., assignor to E. I. du Pont de Nemours and Company, Wilmington, Del., a corporation of Delaware No Drawing. Application August 14, 1956
Serial No. 603,860

9 Claims. (Cl. 260—343.6)

This invention relates to new compositions of matter and to methods for their preparation. More particularly this invention relates to novel dihydrodilactones and methods for their preparation.

When acetylenes are reacted with carbon monoxide in the presence of a catalytic amount of a cobalt carbonyl, as described in the copending patent application of J. C. Sauer, Ser. No. 549,155, filed November 25, 1955, now U. S. Patent 2,840,570, as a continuation-in-part of Ser. No. 432,599, filed May 26, 1954, now abandoned, there are obtained new dilactones corresponding to $$C_8(RR')_2O_4,$$

wherein R and R' are hydrogen, haloaryl, alkoxyaryl, or hydrocarbon radicals free from non-aromatic unsaturation, and which show strong lines in the ultra-violet spectra in the region of 3300–4400 A., yield suberic acids on hydrogenation over platinum in acetic acid and tetrahydro[2,2'-bifuran]-5,5'(2H,2'H)-diones when hydrogenated over palladium to bring about saturation of the two lactone rings and exocyclic double bond.

It is an object of this invention to provide new compositions of matter and methods for their preparation. A further object is to provide novel dihydrodilactones and methods for their preparation. A still further object is to provide novel catalytic processes for converting certain unsaturated dilactones into novel dihydrodilactones. Another object is to provide novel compositions of matter which can be catalytically hydrogenated to produce butyrolactones useful for preparation of polyols. Other objects will appear hereinafter.

These and other objects of this invention are accomplished by providing new dihydrodilactones of the formula $C_8H_2(RR')_2O_4$ wherein R and R' are hydrogen, haloaryl, alkoxyaryl or hydrocarbon free from non-aromatic unsaturation. These new dihydrodilactones are represented by the structural formulas

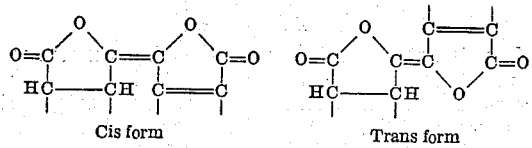

Cis form          Trans form wherein the free valences of the ring carbon atoms are satisfied by hydrogen, alkoxyaryl, especially where the alkoxy group is of not more than 12 carbon atoms and the aryl radical is hydrocarbon of not more than 10 carbon atoms, haloaryl, especially where the aryl radical is hydrocarbon of not more than 10 carbon atoms, or monovalent hydrocarbon radicals free from non-aromatic unsaturation, especially of not more than 12 carbon atoms. Thus, one free valence of each ring is satisfied by R and the other free valence of each ring is satisfied by R', said R and R' being defined as previously indicated. This invention particularly provides the new dihydrodilactone, 3,4-dihydro-[Δ²,²'(5H,5'H)-bifuran]-5,5'-dione, which exists in two stereoisomeric forms represented by the following structural formulas:

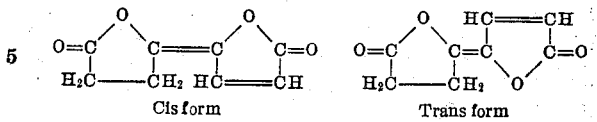

Cis form          Trans form

The novel dihydrodilactones of this invention are obtained by hydrogenating in contact with a ferrous group metal molybdite catalyst an unsaturated dilactone having the formula $C_8(RR')_2O_4$ wherein R and R' are hydrogen, haloaryl, alkoxyaryl or hydrocarbon free from non-aromatic unsaturation.

It has now been found that by effecting the hydrogenation of [Δ²,²'(5H,5'H)-bifuran]-5,5'-dione with a ferrous group metal molybdite catalyst there is obtained 3,4-dihydro-[Δ²,²'(5H,5'H)-bifuran]-5,5'-dione.

In a convenient way for preparing the dihydrodilactones of this invention, a pressure reactor is charged with the unsaturated dilactone, e. g., [Δ²,²'(5H,5'H)-bifuran]-5,5'-dione, a solvent therefor, such as dioxane, and preferably 1% or more, based on the unsaturated dilactone, of a ferrous group metal molybdite hydrogenation catalyst. The reactor is swept with oxygen-free nitrogen, placed on an agitating rack, and contacted with hydrogen, preferably under pressure, at a temperature which is at least 70° C. until there is no further pressure drop. Thereafter the reactor is opened and the contents filtered to remove catalyst and any dihydrodilactone which may have separated from solution. The material on the filter is extracted with ethyl acetate or methyl ethyl ketone and the extract combined with the filtrate. The combined extract and filtrate is then subjected to distillation to remove the solvent and the concentrate allowed to stand. The crystalline material which separates from the concentrate is a dihydrodilactone, 3,4-dihydro-[Δ²,²'(5H,5'H)-bifuran]-5,5'-dione, and is isolated by filtration. It is purified by recrystallization from solution in methyl ethyl ketone or ethyl acetate.

The examples which follow are submitted to illustrate and not to limit this invention.

Example I

A solution of 10 g. of the dilactone, [Δ²,²'(5H,5'H)-bifuran]-5,5'-dione, in 200 ml. of dioxane was shaken with 1.5 g. of reduced nickel molybdite and hydrogen at 3000 lbs./sq. in. and 100° C. for four hours. The product was filtered and concentrated under reduced pressure. The residue was taken up in methyl ethyl ketone and separated into two fractions by extraction with 5% sodium bicarbonate solution. One fraction was acidic and the other was neutral. The neutral fraction was a gummy solid which was dried on a porous plate; 1.4 g. (14%). The compound was twice recrystallized from ethyl acetate-petroleum ether; M. P. 155–160° C. This new compound, which has a dihydrodipyrone composition, was assigned its structure on the basis of its infrared spectra. Had the central double bond been reduced, each lactone ring would still have been identical, and only one carbonyl band would be present. It was found, however, that the carbonyl band was split into two peaks at 5.65µ and 5.50µ, representing one unsaturated and one saturated lactone ring. A saturated carbon-carbon linkage was also indicated by the infrared spectra (3.45µ). This new dihydrodipyrone was 3,4-dihydro-[Δ²,²'(5H,5'H)-bifuran]-5,5'-dione.

*Analysis.*—Calc'd for $C_8H_6O_4$: C, 57.83; H, 3.64. Found: C, 57.47; H, 3.61.

Example II

A mixture of 25 g. of the dilactone of Example I, 200 ml. of dioxane, and 1.6 g. of a nickel molybdite catalyst was shaken with hydrogen at 3000 lbs./sq. in. and 120° C. for 4 hours. During this time the hydrogen absorption was 200 lbs./sq. in. The product, after removal of catalyst and solvent, consisted of 12.3 g. (49%) of solid 3,4-dihydro-[$\Delta^{2,2'(5H,5'H)}$-bifuran]-5,5'-dione and 5.3 g. of a dark oil, which was discarded. The solid product was recrystallized repeatedly from ethyl acetate to give almost colorless crystals melting at 153–156° C., with initial sintering at 148° C. and complete liquefaction at 166° C.

*Analysis.*—Calc'd for $C_8H_6O_4$: C, 57.83; H, 3.67. Found: C, 57.72; H, 3.67.

Infrared spectra: carbonyl of saturated lactone ring, 5.52μ; carbonyl of unsaturated lactone ring, 5.70μ; exocyclic double bond, 5.87μ, and ring double bond, 6.51μ.

Although the hydrogenation of the [$\Delta^{2,2'(5H,5'H)}$-bifuran]-5,5'-dione to the 3,4-dihydro-[$\Delta^{2,2'(5H,5'H)}$-bifuran]-5,5'-dione has been effected batchwise, it is to be understood that this is only for convenience and that it can be carried out as a continuous or semi-continuous upflow, down-flow, co-current, or counter-current vapor or liquid phase operation, with recovery of unconverted reactants for recycling.

The hydrogenation of the [$\Delta^{2,2'(5H,5'H)}$-bifuran]-5,5'-dione is effected with a ferrous group metal molybdite catalyst at pressures which may range from atmospheric up to 5000 lb./sq. in. or more. As a rule pressures in excess of 10 lb./sq. in. but below 3000 lb./sq. in. are used because the reaction takes place at a practical rate with favorable yields of desired product under these conditions.

The particular temperature used is controlled by the nature and activity of the catalyst used. Usually temperatures of at least 70° C. but below 150° C. are used because above 150° C. the yield of desired product is reduced. The range which gives the best combination of reaction rate with yield of desired product is 75–125° C. and this embraces the preferred conditions.

The hydrogenation is preferably carried out in the presence of a reaction medium and suitable media are ethers, e. g., diethyl ether, dioxane, etc., alcohols, e. g., methanol, ethanol, etc., ketones, e. g., cyclohexanone, etc.

The amount of catalyst is at least 0.5% by weight of the [$\Delta^{2,2'(5H,5'H)}$-bifuran]-5,5'-dione. Since the rate of hydrogenation is improved by increasing the catalyst concentration, usually an amount is employed which is in the range of 1–30% by weight of the [$\Delta^{2,2'(5H,5'H)}$-bifuran]-5,5'-dione being hydrogenated.

The nickel molybdite catalyst used in the above examples was prepared as follows:

Seventeen hundred and sixty-six parts of ammonium paramolybdate [$(NH_4)_6Mo_7O_{24}\cdot4H_2O$], equivalent to 10 moles of $MoO_3$, was dissolved in 5000 parts of distilled water and neutralized by the addition of 810 parts of 28% aqueous ammonia. The resulting solution of ammonium molybdate [$(NH_4)_2MoO_4$] containing 1.9 moles excess ammonia was then added with stirring, at room temperature, to a solution of nickel nitrate, prepared by dissolving 2908 parts of nickel nitrate hexahydrate [$Ni(NO_3)_2\cdot6H_2O$], equivalent to 10 moles of nickel salt, in 5000 parts of distilled water. A pale green precipitate was formed in an acid slurry having a pH of approximately 4.0 by alkaline-acid paper. The pH of the slurry was adjusted to 7.0 (Beckmann pH meter) by the addition of 450 parts of 28% aqueous ammonia. The precipitate was then washed, filtered, dried, and calcined at 400° C. for 18 hours. The calcined product, by analysis, was found to contain 23.2% nickel and 46.4% molybdenum.

The calcined product, prepared as described above, was reduced in hydrogen at gradually increasing temperatures up to 550° C. for a total of 25 hours of which period 18 hours was at 550° C. The reduced product was highly pyrophoric and glowed on exposure to air. Analysis of the reduced material showed it to contain 26.66% nickel and 53.1% molybdenum corresponding to $NiMoO_2/0.2MoO_3$.

The catalysts used in the practice of this invention are those containing molybdenum in chemical combination with oxygen and ferrous metal which itself or in the form of an oxide is capable of promoting hydrogenation reactions, in which catalysts the atomic ratio of oxygen to molybdenum has an upper limit of 3:1.

Catalysts of the above type are the ferrous group metal molybdites disclosed and claimed in U. S. Patent 2,572,300, issued to H. R. Arnold and J. E. Carnahan. These molybdites exist in two series, in the first the molybdenum is present in the quadrivalent state corresponding to the oxide $MoO_2$ and the hypothetic acid $H_2MoO_3$, and in the second the molybdenum is present in the bivalent state corresponding to the oxide $MoO$ and the hypothetic acid $H_2MoO_2$. Examples of these molybdites are nickel molybdite, $NiMoO_2$, and cobalt molybdite, $CoMoO_2$ and $CoMoO_3$. These molybdites may contain promoters or modifiers, such as cadmium, barium, chrominum, thorium, etc., if desired. Preferred molybdites because of their high degree of activity and selectivity are the molybdites of nickel and cobalt.

These molybdites may be employed in the form of pellets, or as finely divided powders, and they may be used as such or extended on inert supports such as charcoal, alumina, silica, etc. The particular physical form of the catalyst for maximum activity depends upon the condition under which the hydrogenation reaction is to be conducted. Thus, for continuous operation it is best to have the catalyst in the form of pellets to minimize mechanical losses. If the process is to be operated as a batch operation, it is best that the catalyst be in finely divided form because in that way maximum catalyst activity is obtained.

The unsaturated dilactone [$\Delta^{2,2'(5H,5'H)}$-bifuran]-5,5'-dione used in the examples was prepared by charging into a steel pressure reactor of 400 cc. capacity 26 g. of acetylene, 200 ml. of acetone, and 1.5 g. of dicobalt octacarbonyl. The mixture was heated with carbon monoxide at a pressure of 1000 atmospheres for 14–17 hours. The product was filtered and the brown solid was extracted with ethyl actate for 24 hours. The extract was permitted to crystallize and the crystalline material was separated, and dried at room temperature. There was obtained 20 g. of the unsaturated dilactone, $C_8H_4O_4$, M. P. 229° C. after several recrystallizations from acetic acid.

The [$\Delta^{2,2'(5H,5'H)}$-bifuran]-5,5'-dione yields suberic acid when hydrogenated with platinum in acetic acid and can be represented by the following structural formula

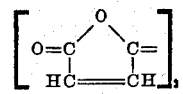

The dilactones used in preparing the compounds of this invention are the products obtained by reacting an acetylene with carbon monoxide in the presence of a cobalt carbonyl catalyst, as disclosed and claimed in the copending patent application of J. C. Sauer, U. S. Ser. No. 549,155, filed November 25, 1955, now U. S. Patent 2,840,530.

The cobalt carbonyl may be made directly by reaction of carbon monoxide with the metal in active form, as described in J. Am. Chem. Soc. 70, 383–6 (1948).

The acetylenes used in preparing these dilactones correspond to R—C≡C—R', in which R and R' are hydrogen, alkoxyaryl, especially where the alkoxy group is of not more than 12 carbon atoms and the aryl radical is hydrocarbon of not more than 10 carbon atoms, haloaryl, especially chloroaryl, where the aryl radical is hydrocarbon of not more than 10 carbon atoms, or monovalent hydrocarbon radicals free from non-aromatic unsaturation, especially of not more than 12 carbon atoms, e. g., alkyl, especially short chain alkyl, i. e., containing not more than 7 carbon atoms, aryl, especially where the aryl radical is hydrocarbon of not more than 10 carbon atoms, aralkyl, especially of not more than 7 carbon atoms, or cycloalkyl, particularly of not more than 7 carbon atoms. Examples of such radicals are methyl, ethyl, octyl, decyl, dodecyl, phenyl, tolyl, xylyl, naphthyl, benzyl, cyclohexyl, methylcycohexyl, chlorophenyl, methoxyphenyl, ethoxyphenyl, decylphenyl, dodecyloxyphenyl, dodecyloxynaphthyl, and the like. Examples of such acetylenes are acetylene, methylacetylene, 2-decyne, phenylacetylene, naphthylacetylene, p-chlorophenylacetylene, p-ethoxyphenylacetylene, p-decyloxyphenylacetylene, benzylacetylene, cyclohexylacetylene, methylcyclohexylacetylene, etc.

By employing such substituted acetylenes there are obtained dilactones corresponding in molecular formula to $C_8(RR')_2O_4$, the radicals R and R' corresponding to the substituents attached to the triply bonded carbon in the acetylene reactant, i. e., R and R' in $R-C\equiv C-R'$. Thus, as shown by the aforementioned Sauer application, there are prepared the following dilactones:

[$\Delta^{2,2'(5H,5'H)}$]-biphenylfuran]-5,5'-dione
[$\Delta^{2,2'(5H,5'H)}$]-bidiethylfuran]-5,5'-dione
[$\Delta^{2,2'(5H,5'H)}$]-bi-n-butylfuran]-5,5'-dione
[$\Delta^{2,2'(5H,5'H)}$]-bi-$\beta$-naphthylfuran]-5,5'-dione
[$\Delta^{2,2'(5H,5'H)}$]-bichlorophenylfuran]-5,5'-dione
[$\Delta^{2,2'(5H,5'H)}$]-bi-o-methoxyphenylfuran]-5,5'-dione and the like.

The reaction between the acetylene and carbon monoxide is carried out batchwise or continuously in the presence of an inert organic liquid medium. By "inert organic liquid medium" is meant organic liquids which contain no active hydrogen, as defined by S. Siggia in his "Quantitative Organic Analysis Via Functional Groups," 2nd ed. (1954), p. 78, chapter 7, and as determined by the Zerewitinoff method, Ber. 40, 2026 (1907); J. Am. Chem. Soc. 49, 3181 (1927). Thus, the acetylene is the only compound in the reaction system which may contain active hydrogen. Specific organic reaction media are isooctane, toluene, acetonitrile, acetone, ethyl acetate, dioxane, cyclohexanone, xylene, benzene, etc.

The unsaturated dilactones can be represented by the general structural formula:

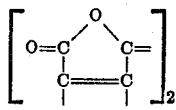

wherein one free valence of each ring is satisfied by R and the other free valence of each ring is satisfied by R', said R and R' being defined as previously indicated. These unsaturated dilactones exist in two isomeric forms which can be represented by the general formulae:

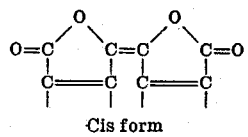

Cis form and

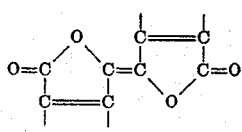

Trans form wherein one free valence of each ring is satisfied by R and the other free valence of each ring is satisfied by R', said R and R' being defined as previously indiacted.

Substitution of the hereinbefore listed substituted dilactones for the [$\Delta^{2,2'(5H,5'H)}$-bifuran]-5,5'-dione of Example I in the process of Example I leads to the obtainment of the corresponding substituted 3,4-dihydrodilactone wherein R and R' are defined as aforesaid with respect to the acetylenes, e. g., from [$\Delta^{2,2'(5H,5'H)}$-bidiethylfuran]-5,5'-dione there is obtained 3,4-dihydro-[$\Delta^{2,2'(5H,5'H)}$-bidiethylfuran]-5,5'-dione, etc.

The new 3,4-dihydrodilactones of this invention when hydrogenated according to the procedures described in my copending patent application Serial No. 592,738, filed June 21, 1956, i. e., at temperatures of 75 to 275° C. under hydrogen pressures of 1000 to 10,000 lbs./sq. in. over nickel in dioxane yields gamma-(gamma-carboxypropyl)butyrolactone or substituted gamma-(gamma-carboxylpropyl)butyrolactones. These latter compounds are precursors of octanetriols which are useful for the preparation of polyesters. The gamma-(gamma-carboxylpropyl)butyrolactones are converted to the octanetriols by hydrogenation over a copper barium chromite catalyst at a temperature of 225° C. under a hydrogen pressure of 3000 lb./sq. in. according to the general procedure disclosed in my aforesaid copending patent application, filed June 21, 1956. The octanetriols, being polyhydric alcohols, are useful for preparing polymeric polyesters by reaction with carboxylic acids, such as adipic and sebacic acids. The resulting polymeric polyesters are useful as protective coatings, as components of coating compositions, and the like.

The new 3,4-dihydrodilactones of this invention react with polyamines, e. g., hexamethylenediamine to yield polymeric materials useful as adhesives. Thus, small amounts of 3,4-dihydro-[$\Delta^{2,2'(5H,5'H)}$-bifuran]-5,5'-dione and hexamethylenediamine were mixed in acetone and the mixture warmed on a steam bath. An oily substance was obtained, which after evaporation yielded a tacky polymer useful as an adhesive.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. 3,4-dihydro-[$\Delta^{2,2'(5H,5'H)}$-bifuran]-5,5'-dione.

2. A dihydrodilactone having one saturated lactone ring and one unsaturated lactone ring and being represented by one of the structural formulas selected from the class consisting of

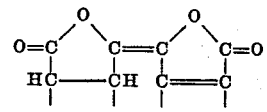

and

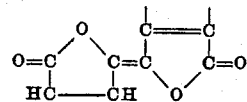

wherein one free valence of each ring is satisfied by R and the other free valence of each ring is satisfied by R', said R and R' being selected from the class consisting of hydrogen, alkoxyaryl where the alkoxy radical is not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carbon atoms.

3. Process for preparing a dihydrodilactone as set forth in claim 2 having one saturated lactone ring and one unsaturated lactone ring which comprises hydrogenating an unsaturated dilactone in contact with at least 0.5%, based on the weight of said unsaturated dilactone, of a ferrous group metal molybdite catalyst at a temperature of at least 70° C. and in contact with hydrogen, said unsaturated dilactone being represented by one of the structural formulas selected from the class consisting of

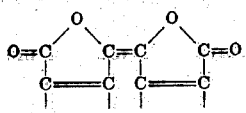

and

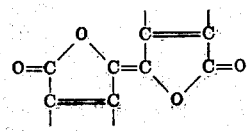

wherein one free valence of each ring is satisfied by R and the other free valence of each ring is satisfied by R', said R and R' being selected from the class consisting of hydrogen, alkoxyaryl where the alkoxy radical is not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carbon atoms, and obtaining as the resulting product a dihydrodilactone having one saturated lactone ring and one unsaturated lactone ring as set forth in claim 2.

4. Process for preparing a dihydrodilactone as set forth in claim 3 wherein said ferrous group metal molybdite catalyst is nickel molybdite.

5. Process for preparing a dihydrodilactone having one saturated lactone ring and one unsaturated lactone ring which comprises hydrogenating the unsaturated dilactone $[\Delta^{2,2'(5H,5'H)}$-bifuran]-5,5'-dione in contact with at least 0.5%, based on the weight of said unsaturated dilactone, of a ferrous group metal molybdite catalyst at a temperature of at least 70° C. and in contact with hydrogen and obtaining as the resulting product 3,4-dihydro-$[\Delta^{2,2'(5H,5'H)}$-bifuran]-5,5'-dione.

6. Process for preparing a dilactone as set forth in claim 5 wherein said ferrous group metal molybdite catalyst is nickel molybdite.

7. Process for preparing a dihydrodilactone as set forth in claim 5 wherein said $[\Delta^{2,2'(5H,5'H)}$-bifuran]-5,5'-dione is hydrogenated in dioxane and said ferrous group metal molybdite catalyst is nickel molybdite.

8. Process for preparing a dihydrodilactone having one saturated lactone ring and one unsaturated lactone ring which comprises hydrogenating the unsaturated dilactone $[\Delta^{2,2'(5H,5'H)}$-bifuran]-5,5'-dione in contact with from 1 to 30%, based on the weight of said unsaturated dilactone, of a ferrous group metal molybdite catalyst at a temperature within the range of 70 to 150° C. and in contact with hydrogen under a pressure within the range of 10 to 5000 lbs./sq. in., and obtaining as the resulting product 3,4-dihydro-$[\Delta^{2,2'(5H,5'H)}$-bifuran]-5,5'-dione.

9. Process for preparing a dihydrodilactone as set forth in claim 8 wherein said $[\Delta^{2,2'(5H,5'H)}$-bifuran]-5,5'-dione is hydrogenated in an organic solvent therefor and said ferrous group metal molybdite catalyst is nickel molybdite.

References Cited in the file of this patent

FOREIGN PATENTS 849,104    Germany _____ Sept. 11, 1952

OTHER REFERENCES

Klingsberg: Chemical Reviews, vol. 54: pages 59–77 (1954).

Fang et al.: Journal of Organic Chemistry, vol. 16: pages 1231–1237 (1951).

Dufraisse et al.: Bulletin de la Societe Chimique de France, vol. 1, pages 771–89 (1934) (Part 1).

Beilstein's Handbuch der Organischen Chemie, vol. XIX (1934), pages 185 and 186; system No. [2771], part 13, compounds 1 and 2 (4th edition).

Lukes et al.: Chemicke Listy (Czechoslovakia), vol. 48: pages 560–8 (1954) (see Chemical Abstracts Index, vol. 49 (1956), page 351-S, column 1).